UNITED STATES PATENT OFFICE.

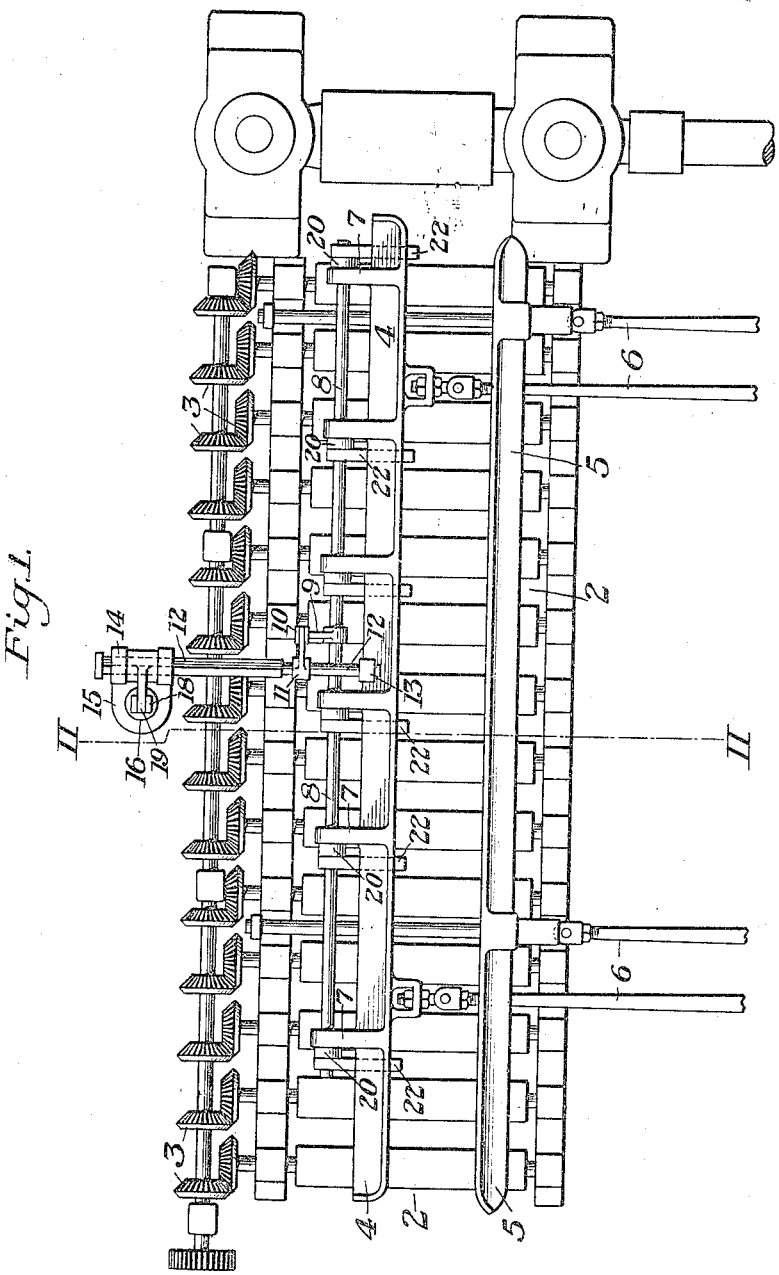

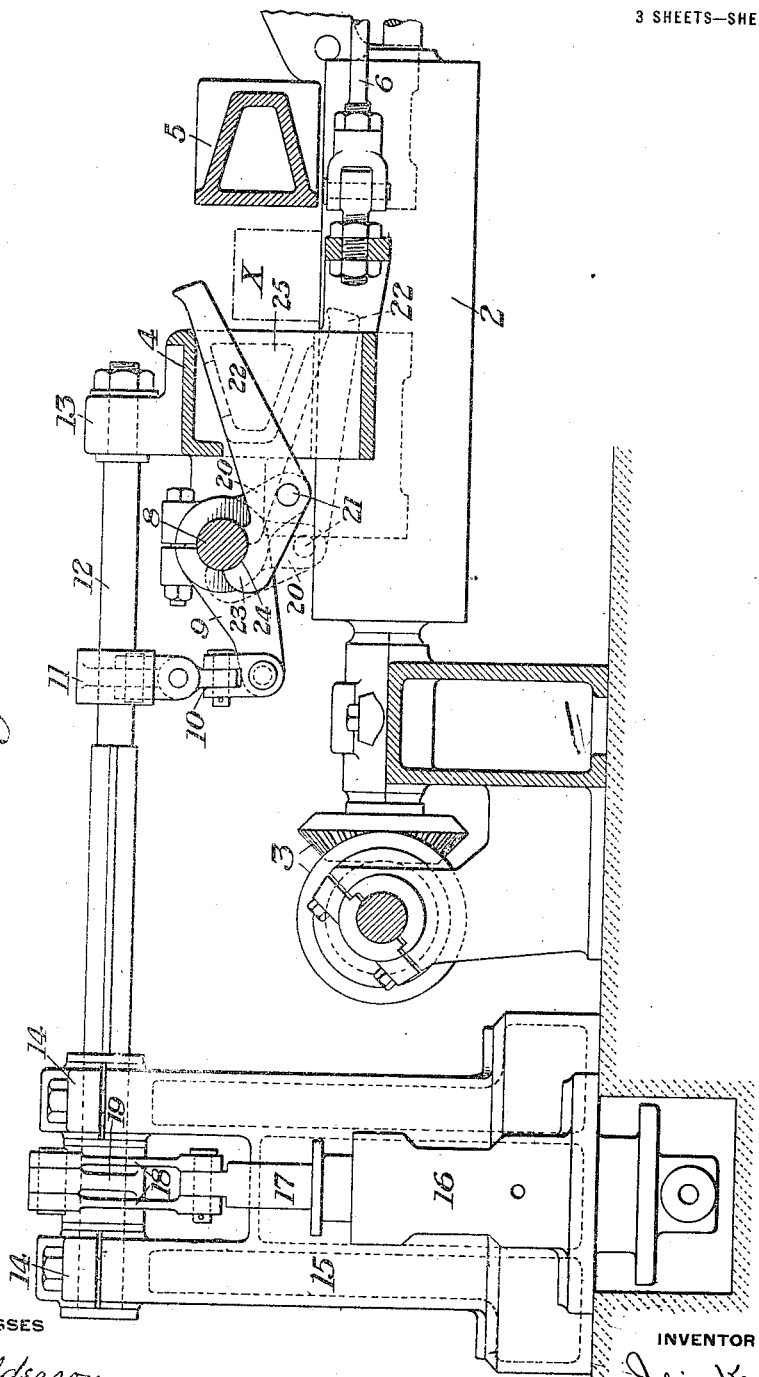

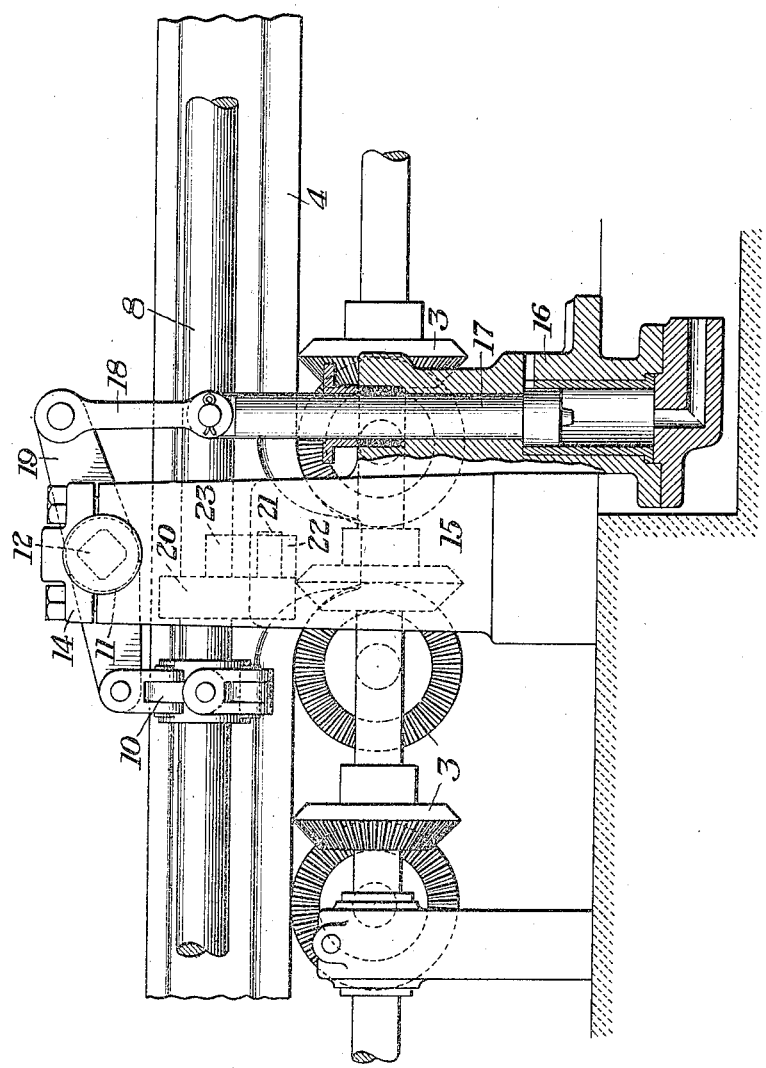

JULIAN KENNEDY, OF PITTSBURGH, PENNSYLVANIA.

MANIPULATOR FOR ROLLING-MILLS.

1,268,579.    Specification of Letters Patent.    Patented June 4, 1918.

Original application filed March 13, 1916, Serial No. 83,699. Divided and this application filed January 17, 1917. Serial No. 142,784.

*To all whom it may concern:*

Be it known that I, JULIAN KENNEDY, a citizen of the United States, residing at Pittsburgh, in the county of Allegheny and State of Pennsylvania, have invented a new and useful Improvement in Manipulators for Rolling-Mills, of which the following is a full, clear, and exact description, reference being had to the accompanying drawings, forming part of this specification, in which—

Figure 1 is a plan view of a portion of a rolling mill having my improved manipulator applied thereto;

Fig. 2 is a sectional view taken on the line II—II of Fig. 1;

Fig. 3 is a view partly in section and partly in elevation of a portion of the mechanism for actuating the manipulator fingers.

The present application is a division of my pending application Serial No. 83,699, filed March 13, 1916.

The object of the present invention is to provide a manipulator for rolling mills of novel and efficient character, and in which the movement of the manipulator fingers or members is of simple and positive character.

The invention will be best understood by reference to the accompanying drawings, in which I have shown the preferred embodiment thereof, and which will now be described, it being premised, however, that various changes may be made in the details of construction and arrangement of the various parts, without departing from the spirit and scope of my invention, as defined in the appended claims.

In these drawings, the numeral 2 designates a rolling mill table which may be of any usual or desired type. In the form illustrated of an ordinary roller table, the roll is driven by the gears 3. 4 and 5 designate the guides which may be mounted for transverse movement relatively of the table by means of any suitable actuating connections, such as those indicated at 6.

The guide 4 is provided with a plurality of projections 7, in which is journaled a longitudinally extending manipulator shaft 8. Rigidly connected to this shaft is a crank arm 9, having a universal joint connection 10, with a collar 11, which is rigidly secured to a rock shaft 12. This rock shaft 12 is rotatably secured to a lug 13 on the guide 4, and is mounted to slide endwise in suitable bearings 14 of a stand 15. 16 is a double-acting hydraulic cylinder whose plunger 17 is connected by links 18 with the crank arm 19 of the rock shaft 12. The manipulator shaft 8 has a plurality of crank arms 20, to each of which is pivoted at 21 a manipulator finger 22. Each of these fingers has an extension 23, back of its pivot 21, and such extension has a concavity 24 therein to fit a portion of the periphery of the manipulator shaft. The manipulator fingers 22 extend through slots or openings 25 in the guide 4. Normally, the fingers are in the dotted position shown in Fig. 2, with their ends lying underneath and in position to actuate and rotate the blank X, which is being rolled and which is between the guides 4 and 5. When power is admitted to the cylinder 16, the plunger 17 is actuated to rock the shaft 12, and thereby, through the connections described, the manipulator shaft. As the latter is rocked, the crank arms 20 are moved from the position shown in dotted lines to the position shown in full lines in Fig. 2, thereby carrying the manipulator fingers forward through the openings in the guide 4, and by reason of the engagement of the heel portions of these fingers with the manipulator shaft, they are caused to move upwardly as they are moved forwardly, thereby actuating and turning the work pieces. The action of the cylinder 16 is then reversed, thereby moving the fingers back to their dotted line position in Fig. 2.

The mounting of the rock shaft 12 to enable it to slide endwise through the bearings and also through the crank arm 19 takes care of the different adjusted positions of the guide 4.

The described movement of the manipulator fingers is an exceedingly simple and positive one, the provision of the fulcrum of their heel portions against the manipulator fingers giving them a powerful lifting and turning action, while the construction affords a break joint in the manipulator finger on its return movement in the event it contacts with the work piece.

I claim:

1. In a manipulator for rolling mills, the combination with a guide, of a rocking manipulator shaft journaled on said guide and having a plurality of crank arms, a manipulator finger pivoted to each of said crank arms and having a fulcrum engagement at its heel portion with the manipulator shaft, and means for actuating said shaft, substantially as described.

2. A manipulator for rolling mills, comprising a guide, a rock shaft mounted thereon, and having a crank arm, connections for actuating said shaft, and a manipulator finger pivoted to said crank arm and having a heel portion contacting with the shaft, substantially as described.

3. A manipulator comprising a guide, a rock shaft journaled thereon and having a crank arm, a manipulator finger pivoted to the crank arm and having a heel portion contacting with said shaft, a second rock shaft having actuating connections with the first named shaft, and means for actuating the second named shaft, substantially as described.

4. A manipulator comprising a laterally movable guide, a rock shaft journaled thereon, a series of manipulator fingers carried by the rock shaft, another rock shaft connected to the guide and mounted for endwise movement, means for actuating said shaft, and an actuating connection between the two shafts, substantially as described.

5. A manipulator, comprising a movable guide, a rock shaft journaled thereon, and having a crank member, a manipulator finger pivoted to the crank member and having a portion in the rear of its pivot contacting with said shaft, and means for actuating said shaft, substantially as described.

6. A manipulator comprising a laterally movable guide, a rock shaft journaled thereon and having a crank member, a manipulator finger pivoted to the crank member and having a heel portion contacting with said shaft, a second rock shaft having an actuating connection with the first named shaft, and means for actuating the second named rock shaft, said shafts and actuating means being arranged to permit of lateral movement of said guide, substantially as described.

7. A manipulator shaft, and a manipulator member pivoted to an arm of said shaft, said member having stop means for preventing movement of said member on its pivot in one direction but permitting such movement in the opposite direction, substantially as described.

In testimony whereof, I have hereunto set my hand.

JULIAN KENNEDY.